United States Patent
Ahn et al.

(10) Patent No.: US 11,146,347 B2
(45) Date of Patent: Oct. 12, 2021

(54) TDD SUB-SYSTEM OF DISTRIBUTED ANTENNA SYSTEM USING TIME DIVISION DUPLEXING MODE

(71) Applicant: KMW INC., Hwaseong-si (KR)

(72) Inventors: SeongMin Ahn, Hwaseong-si (KR); MinSeon Yun, Hwaseong-si (KR); SeokJin Lee, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 22 days.

(21) Appl. No.: 16/828,041

(22) Filed: Mar. 24, 2020

(65) Prior Publication Data

US 2020/0228217 A1 Jul. 16, 2020

Related U.S. Application Data

(63) Continuation of application No. PCT/KR2018/010115, filed on Aug. 31, 2018.

(30) Foreign Application Priority Data

Sep. 29, 2017 (KR) .......................... 10-2017-0127964
Apr. 6, 2018 (KR) .......................... 10-2018-0040264

(51) Int. Cl.
*H04J 3/06* (2006.01)
*H04J 3/14* (2006.01)
*H04L 5/14* (2006.01)

(52) U.S. Cl.
CPC ..................... *H04J 3/06* (2013.01); *H04J 3/14* (2013.01); *H04L 5/14* (2013.01)

(58) Field of Classification Search
CPC .................. H04J 3/06; H04J 3/14; H04L 5/14
See application file for complete search history.

(56) References Cited

U.S. PATENT DOCUMENTS

| | | | | |
|---|---|---|---|---|
| 8,401,041 | B2 * | 3/2013 | Wang ................. | H04B 1/70754 370/503 |
| 9,560,613 | B1 * | 1/2017 | Srinivasan .......... | H04W 56/001 |
| 2009/0180407 | A1 | 7/2009 | Sabot et al. | |
| 2010/0291925 | A1 * | 11/2010 | Nagata ................ | H04J 11/0069 455/434 |

(Continued)

FOREIGN PATENT DOCUMENTS

KR 10-1048960 B1 7/2011
KR 10-2011-0100563 A 9/2011

(Continued)

OTHER PUBLICATIONS

International Search Report for PCT/KR2018/010115 dated Nov. 20, 2018 and its English translation.

*Primary Examiner* — Huy D Vu
*Assistant Examiner* — Bailor C. Hsu
(74) *Attorney, Agent, or Firm* — Seung Ho Lee (57) ABSTRACT

The present disclosure relates to a time division duplexing (TDD) sub-system of a distributed antenna system using a TDD mode. According to the present disclosure, a head-end unit of a distributed antenna system using a division duplexing mode has a TDD sub-system which includes a TDD sync detection module, a TDD sync replica module, a TDD sync self delay detection module, and a TDD sync operator delay detection module, whereby quickly detecting possible errors in the system operation, and more efficiently performing responsive servicing thereto.

12 Claims, 8 Drawing Sheets

(56) References Cited

U.S. PATENT DOCUMENTS

2011/0216757 A1*  9/2011  Michel ................. H04W 56/00
                                                      370/350
2016/0227496 A1*  8/2016  Panteleev ............... H04W 4/50

FOREIGN PATENT DOCUMENTS

KR      10-1745669 B1    6/2017
WO      2011-090294 A2   7/2011

* cited by examiner

TDD SUB-SYSTEM OF DISTRIBUTED ANTENNA SYSTEM USING TIME DIVISION DUPLEXING MODE

CROSS-REFERENCE TO RELATED APPLICATIONS

This application is a continuation application of International Application No. PCT/KR2018/010115, filed on Aug. 31, 2018, which claims priority and benefits of Korean Application Nos. 10-2017-0127964, filed on Sep. 29, 2017 and 10-2018-0040264, filed on Apr. 6, 2018, the content of which is incorporated herein by reference in their entirety.

TECHNICAL FIELD

The present disclosure in some embodiments relates to a Time Division Duplexing (TDD) sub-system of a distributed antenna system using a TDD mode.

BACKGROUND

The statements in this section merely provide background information related to the present disclosure and do not necessarily constitute prior art.

Communications network operators provide services to the coverage area of the wireless devices location by using a wireless communication system. A Distributed Antenna System (DAS) may be used to extend the coverage of such a wireless communication system.

The DAS may be configured to support TDD operation in which downlink and uplink signals are transmitted and received by using at least some common frequencies or common portions of the signal path, respectively. The DAS configured for TDD operation may include one or more switches for isolating the downlink signal path from the uplink signal path.

In addition, multiple communications network operators may use the same DAS to extend the coverage area of each wireless communication system. The entity that configures or operates the DAS may be independent of the network operators that use the DAS. Those entities independent of the network operators need to be configured to have their DAS carry out switching operation in conformity with the TDD configuration employed by the network operators.

DISCLOSURE

Technical Problem

The present disclosure in some embodiments seeks to provide a TDD sub-system in a distributed antenna system using a TDD mode, whereby quickly detecting possible errors in the system operation, and more efficiently performing responsive servicing thereto.

SUMMARY

At least one aspect of the present disclosure provides a Time Division Duplexing (TDD) sub-system of a distributed antenna system including a TDD sync detection module, a TDD sync replica module, a TDD sync self delay detection module, and a TDD sync operator delay detection module. The TDD sync detection module is configured to detect a Tsync reference signal from a signal received from a base station. The TDD sync replica module is configured to perform a validation on the Tsync reference signal based on uplink/downlink configuration information associated with the signal, and to output the Tsync reference signal as a TDD sync signal for TDD switching control when the Tsync reference signal is verified to be valid and output a pre-stored Tsync reference signal as the TDD sync signal for the TDD switching control when the Tsync reference signal is not verified to be valid. The TDD sync self delay detection module is configured to perform a detection of delay difference information of the Tsync reference signal and to provide, based on the detection, alarm information about whether or not the Tsync reference signal is delayed. The TDD sync operator delay detection module is configured to perform a detection of delay difference information of one or more other base station signals with respect to a reference of the TDD sync signal and to provide, based on the detection, alarm information about whether or not the other base station signal is delayed.

Another aspect of the present disclosure provides a method of supporting a TDD mode of a distributed antenna system including detecting a Tsync reference signal from a signal received from a base station, and performing a validation on the Tsync reference signal based on uplink/downlink configuration information associated with the signal, and outputting the Tsync reference signal as a TDD sync signal for TDD switching control when the Tsync reference signal is verified to be valid and outputting a pre-stored Tsync reference signal as the TDD sync signal for the TDD switching control when the Tsync reference signal is not verified to be valid, and performing a detection of delay difference information of the Tsync reference signal and providing, based on the detection, alarm information about whether or not the Tsync reference signal is delayed, and performing a detection of delay difference information of one or more other base station signals with respect to a reference of the TDD sync signal and providing, based on the detection, alarm information about whether or not the other base station signal is delayed.

Yet another aspect of the present disclosure provides a distributed antenna system including a TDD sync detection module, a TDD sync replica module, a TDD sync self delay detection module, and a TDD sync operator delay detection module. The TDD sync detection module is configured to detect a Tsync reference signal from a signal received from a base station. The TDD sync replica module is configured to perform a validation on the Tsync reference signal based on uplink/downlink configuration information associated with the signal, and to output the Tsync reference signal as a TDD sync signal for TDD switching control when the Tsync reference signal is verified to be valid and output a pre-stored Tsync reference signal as the TDD sync signal for the TDD switching control when the Tsync reference signal is not verified to be valid. The TDD sync self delay detection module is configured to perform a detection of delay difference information of the Tsync reference signal and to provide, based on the detection, alarm information about whether or not the Tsync reference signal is delayed. The TDD sync operator delay detection module is configured to perform a detection of delay difference information of one or more other base station signals with respect to a reference of the TDD sync signal and to provide, based on the detection, alarm information about whether or not the other base station signal is delayed.

Advantageous Effects

As described above, the present disclosure in some embodiments can provide a TDD sub-system in a distributed antenna system using a TDD mode, thereby quickly detecting possible errors in the system operation, and more efficiently performing responsive servicing thereto.

REFERENCE NUMERALS

100: base station
112: TDD sub-system
200: TDD sync detection module
220: TDD sync self delay detection module
230: TDD sync operator delay detection module
110: head-end unit
120: remote unit
210: TDD sync replica module

DETAILED DESCRIPTION

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely for the purpose of differentiating one component from the other, not to imply or suggest the substances, the order or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

Figure 1:
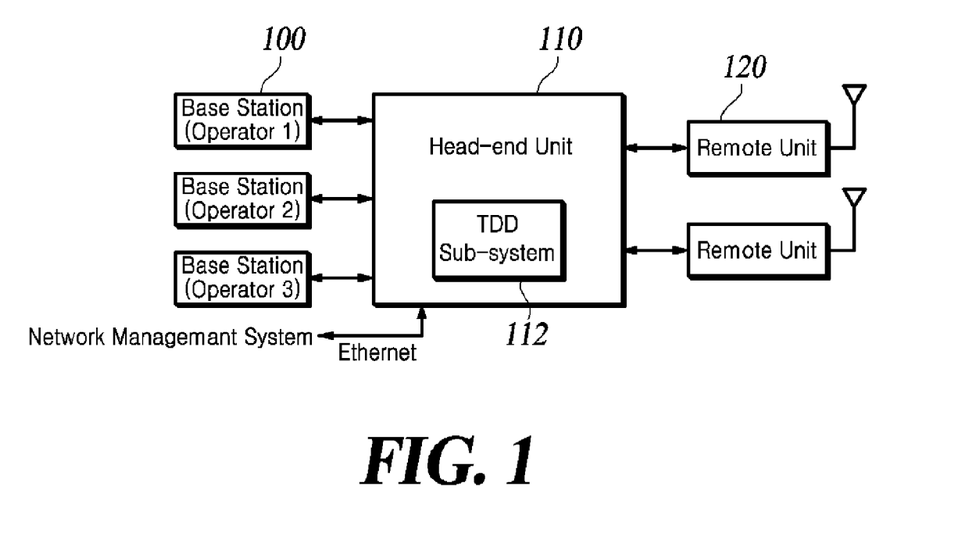
FIG. 1 is a schematic diagram of an example distributed antenna system or DAS using a time division duplexing or TDD scheme.

FIG. 1 is a schematic diagram of an example DAS (distributed antenna system) using a TDD (time division duplexing) scheme.

The DAS can include a head-end unit 110 in communication with one or more remote units 120 and one or more base stations (operators) 100. In some aspects, different base stations may communicate signals associated with different wireless operators. The DAS may be located in a geographic area (e.g., stadium, office building, etc.) to extend the wireless communication coverage of the base station 100.

The DAS may include a downlink path for transmitting downlink signals from the base station 100 to the one or more remote units 120. The DAS may receive a downlink signal from the base station 100 over a wired or wireless communication medium. The downlink signal is propagated by the remote unit 120 to a coverage area. The DAS may also include an uplink path for transmitting uplink signals from the one or more remote units 120 to one or more base stations 100 or repeaters. The uplink signal is a signal of a frequency in an uplink frequency band, which is received by one or more of the remote units 120 from a communication device in the coverage area.

The head-end unit 110 may communicate signals between the base station 100 and the remote unit 120. The head-end unit 110 and the remote unit 120 may communicate via any suitable communication link (e.g., optical fiber, coaxial cable, etc.). The head-end unit 110 and the remote unit 120 may include an analog-to-digital converter and a digital-to-analog converter for digital communication over the communication link.

For purposes of illustration, FIG. 1 shows a single head-end unit 110 in communication with three base stations 100 and two remote units 120. However, the DAS may include any number of head-end units and any number of base stations (or other signal sources) and any number of remote units.

The DAS may be configured to support a TDD (Time Division Duplexing) operation for a number of communications network operators communicating signals through the DAS. For example, the DAS may switch between the uplink mode for communicating TDD signals in the uplink direction and the downlink mode for communicating the TDD signals in the downlink direction. In other words, the DAS configured for TDD operation may include one or more switches for separating the downlink signal path from the uplink signal path. The DAS supporting the TDD operation requires switching control on the downlink and uplink signals. The DAS, which is not provided with the TDD switching signal from the base station 100, needs to generate a TDD sync signal from the downlink signal received from the base station 100 for switching control on the downlink and uplink signals. To this end, the head-end unit 110 may include a TDD sub-system 112 for generating a TDD sync signal from the downlink signal, and may transmit the generated TDD sync signal to the remote unit via the communication link.

According to the present disclosure, the head-end unit 110 detects or estimates a TDD sync signal for TDD switching control from a downlink signal of one base station 100 selected from a plurality of supported base stations 100, and it stores a replica of the detected TDD sync signal.

Thereafter, when the currently used TDD sync signal is dropped or at the occurrence of a failure, the head-end unit 110 operates to switch to another base station signal and uses a replica of the TDD sync signal to maintain the system operation until a normal TDD sync signal is extracted after the switching.

In addition, according to at least one embodiment of the present disclosure, the head-end unit 110 calculates a real-time delay deviation of the base station's downlink signal used currently to generate the TDD sync signal, and calculates real-time delay deviations between the downlink signals of other base stations, and transmits an alarm to an external network maintenance system (NMS) when the calculated real-time delay deviation falls outwith a permitted threshold range.

Figure 2:
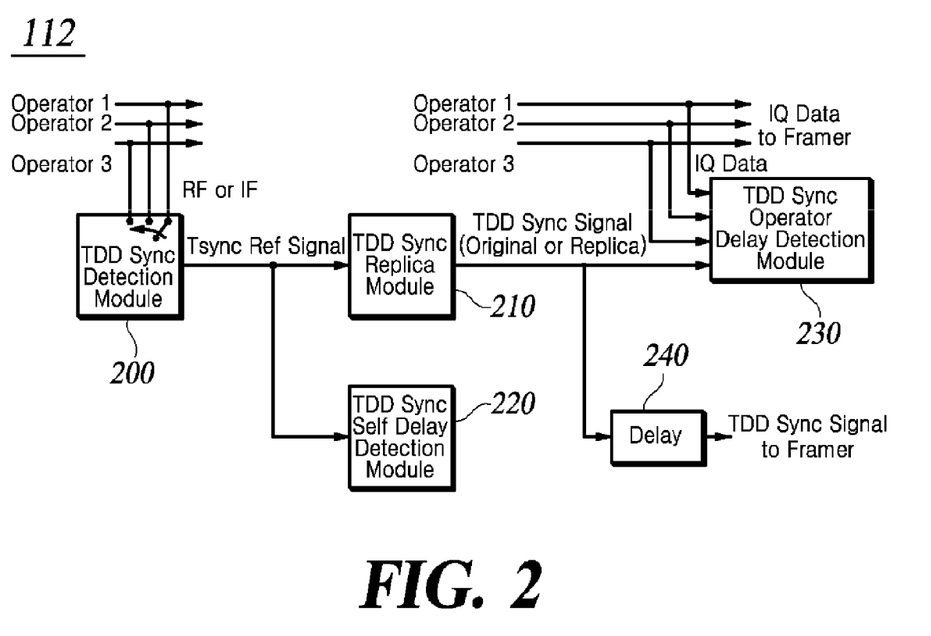
FIG. 2 is a schematic block diagram of a configuration of a TDD sub-system that may be included in a head-end unit, in accordance with at least one embodiment of the present disclosure.

FIG. 2 a schematic block diagram of a configuration of a TDD sub-system that may be included in a head-end unit, in accordance with at least one embodiment of the present disclosure.

As shown in FIG. 2, the TDD sub-system 112 may include a Tsync reference signal detection module or TDD sync detection module 200, a TDD sync replica module 210, a TDD sync self delay detection module 220, and a TDD sync operator delay detection module 230. Each of these components of the TDD sub-system 112 may be implemented in software or hardware components, respectively. For example, each component of TDD sub-system 112 may be configured as an FPGA.

The TDD sync detection module 200 generates an estimated TDD sync signal from a downlink signal of an RF frequency band or an IF frequency band received from one of a plurality of base stations. For example, the TDD sync detection module 200 may calculate a short-term average power of the downlink signal and compare the calculated short-term average power to a TDD threshold, thereby estimating the TDD sync signal. The TDD sync signal estimated by the TDD sync detection module 200 is hereinafter referred to as a 'Tsync reference signal' or 'Tsync ref signal'.

The TDD sync replica module 210 performs an uplink/downlink or DL-UL configuration validation on the Tsync ref signal generated by the TDD sync detection module 200, outputs a Tsync ref signal determined to be valid as a TDD sync signal, and stores a replica of the Tsync ref signal. The replica of the Tsync ref signal is used in response to the currently used TDD sync signal being dropped or at the occurrence of a failure for making a switch to another communications network operator and maintaining the system operation until a normal TDD sync signal is extracted after the switching. On the other hand, in the present embodiment, the DL-UL configuration, which is criterion for the validity check, may be detected through the TDD sync detection module 200 and transferred onto the TDD sync replica module 210, and in another embodiment, the DL-UL configuration may be directly input by the administrator on the TDD sync replica module 210. Meanwhile, the TDD sync detection module 200 may utilize a conventional DL-UL configuration detection algorithm in the process of detecting the DL-UL configuration. For example, in the present embodiment, TDD sub-system 112 may be configured in the form of hardware or software, e.g., an FPGA. In this case, the TDD sync detection module 200 may detect the DL-UL configuration through a DL-UL configuration detection algorithm supported by a company such as INNOS generating the relevant FPGA.

The TDD sync replica module 210 is responsive to when the pulse width of the Tsync ref signal is outside the effective range of the DL-UL configuration for generating a TDD sync configuration alarm and outputting a replica of the stored Tsync ref signal as a TDD sync signal. Here, the replica of the stored Tsync ref signal may be a replica of the Tsync ref signal whose validity is verified among the previous Tsync ref signals received in the TDD sync replica module 210. The construction and operation of the TDD sync replica module 210 will be detailed below with reference to FIG. 4.

The TDD sync self delay detection module 220 detects a delay difference of the Tsync ref signal received from the TDD sync detection module 200 and generates an alarm when the detected delay difference is out of a predetermined threshold range.

Figure 3A:
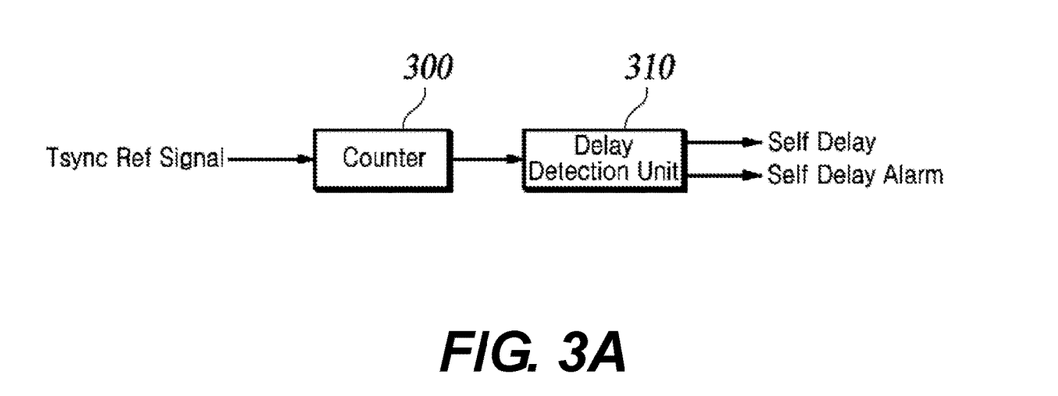
FIGS. 3A and 3B are diagrams for explaining the operation of a TDD sync self delay detection module.
Figure 3B:
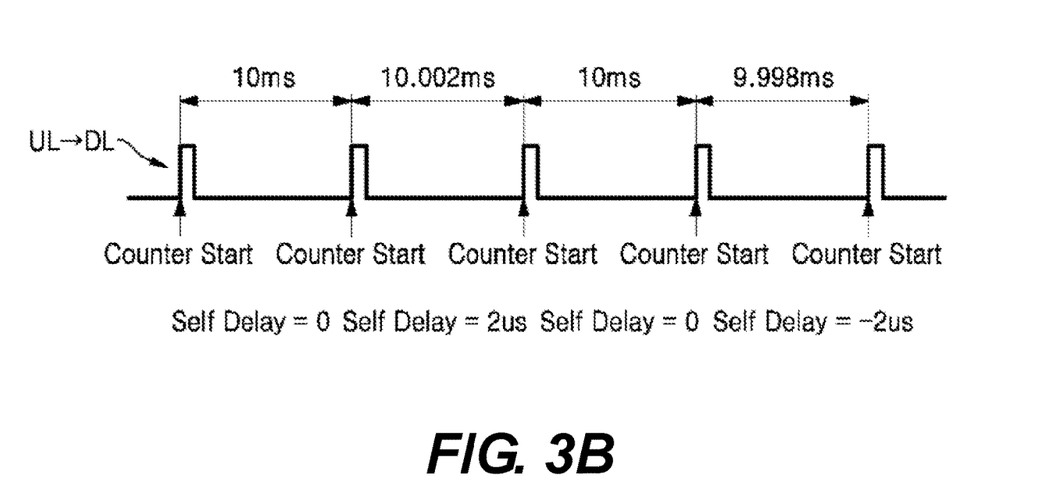

As illustrated in FIGS. 3A and 3B, the TDD sync self delay detection module 220 counts the interval between rising edges, i.e., points that transition as UL→DL in the Tsync ref signal at a resolution of, for example, 100 ns. The TDD sync self delay detection module 220 compares the detected count value with a period of a TDD frame to detect the delay difference as indicated by 'Self Delay' in FIG. 3A, wherein the period may be 5 ms or 10 ms depending on the DL-UL configuration. When the detected delay difference falls outwith a predetermined threshold range, e.g., −3 μs to +3 μs, the TDD sync self delay detection module 220 transmits an alarm to an external network maintenance system (NMS).

To this end, the TDD sync self delay detection module 220 may include a counter 300 and a delay detector 310. Further, the TDD sync self delay detection module 220 may display a maximum value of the variation of the self delay for, for example, 2 seconds on a display provided in the head-end unit 110, or may report to the network maintenance system.

The TDD sync operator delay detection module 230 detects one or more delay differences of other network operators' signals from the Tsync ref signal and generates an alarm when the detected delay difference is out of a predetermined threshold range. The configuration and operation of the TDD sync operator delay detection module 230 will be detailed below with reference to FIG. 5.

The TDD CDMA sub-system 112 has a processor for equalizing the delay of the TDD sync signal provided from the TDD sync replica module 210 to IQ data and then providing such equalized TDD sync signal to a framer (not shown) which frames the digital downlink signal for transmission to the remote unit. To this end, the TDD sub-system 112 may include a delay module 240.

Figure 4:
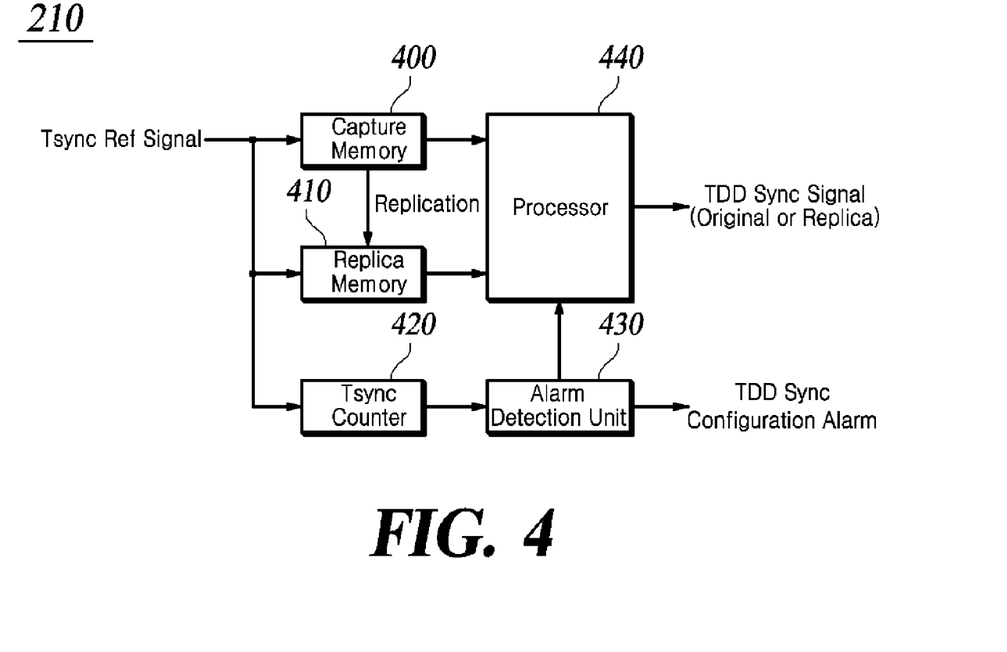
FIG. 4 is a schematic block diagram of a TDD sync replica module according to at least one embodiment of the present disclosure.

FIG. 4 is a schematic block diagram of a schematic configuration of the TDD sync replica module 210 in accordance with at least one embodiment of the present disclosure. As shown in FIG. 4, the TDD sync replica module 210 includes a capture memory 400, a replica memory 410, a Tsync counter 420, an alarm detection unit 430, and a processor 440.

The processor 440 captures 5 ms or 10 ms of the Tsync ref signal at 100 ns resolution and stores the Tsync ref signal in the capture memory 400. When the captured signal is normal, the processor 440 replicates the data from the capture memory 400 and stores the replica, namely, TDD sync replica signal in the replica memory 410.

The Tsync counter 420 counts high states and low states of the Tsync ref signal at 100 ms resolution.

The alarm detection unit 430 checks the interval between rising edges from the count values of the high states/low states as counted by the Tsync counter 420 and determines whether the checked interval corresponds to the UL-DL configuration.

The processor 440 outputs a TDD sync original signal from the capture memory 400 when the Tsync ref signal is in the normal range (≤±3 μs). On the other hand, when the Tsync ref signal is abnormal, the processor 440 outputs a TDD sync replica signal from the replica memory 410 and generates a TDD sync configuration alarm.

Figure 5:
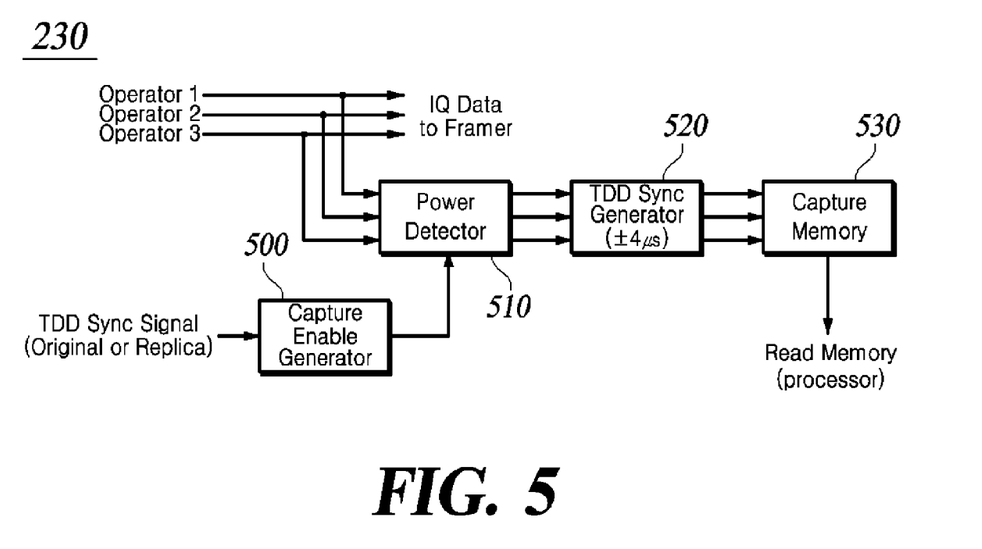
FIG. 5 is a schematic block diagram of a TDD sync operator delay detection module according to at least one embodiment of the present disclosure.

FIG. 5 is a schematic block diagram of a TDD sync operator delay detection module 230 according to at least one embodiment of the present disclosure.

As shown in FIG. 5, the TDD sync operator delay detection module 230 includes a capture enable generator 500, a power detector 510, a TDD sync generator 520, and a capture memory 530.

The capture enable generator 500 generates a capture enable signal for the duration of ±4 μs (=detection range) from the UL→DL transition point, i.e., the rising edge of the TDD sync signal.

The power detector 510 detects power from the IQ data of each of network operators, e.g., other base stations, which is captured during the capture enable section.

The TDD sync generator 520 detects the TDD sync signal for each communications network operator from the power detected during the capture enable section and stores the detected TDD sync signal in the capture memory 530. For example, the TDD sync generator 520 may detect the TDD sync signal by designating a power range of a predetermined quantity or more of power as a value of 1 and designating a power range of a predetermined quantity or less of power as a value of 0.

The processor reads the TDD sync signal for each communications network operators from the capture memory 530 and calculates a delay deviation (=target network operator delay−reference network operator delay). The processor generates an alarm when the delay deviation falls outwith a predetermined threshold range, e.g., −3 μs to +3 μs.

Figure 6:
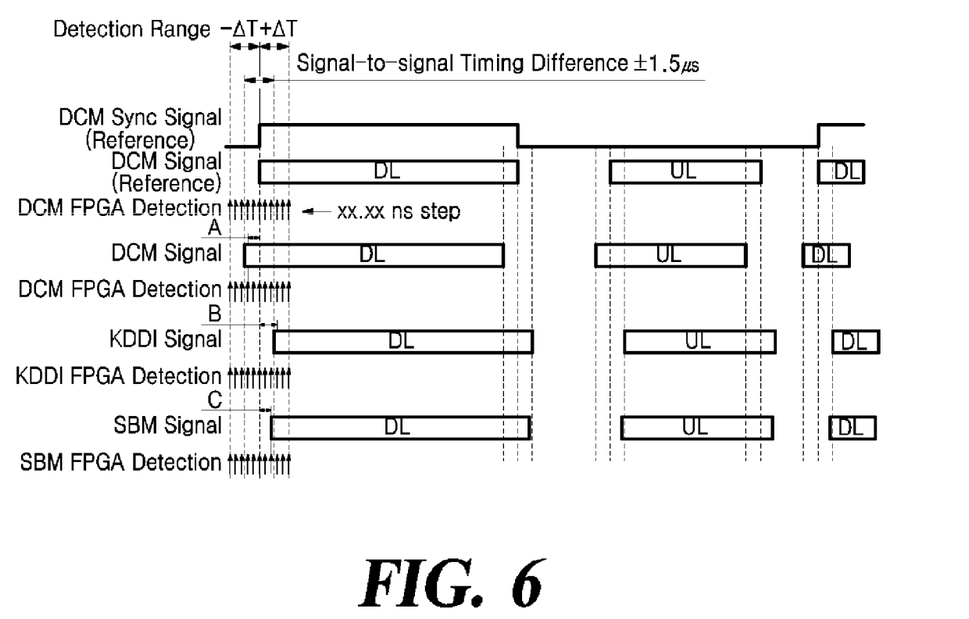
FIG. 6 is a diagram for explaining the operation of the TDD sync operator delay detection module.

FIG. 6 illustrates that the TDD sync operator delay detection module 230 detects a rising edge of each of the DCM signal, the KDDI signal, and the SBM signal through power detection for each xx.xx ns step within a detection range of ±ΔT with respect to a reference of the DCM sync signal.

As shown in FIG. 6, a method is provided for calculating a real-time delay deviation between downlink signals of other base stations by comparing rising edges of signals of the other base stations with respect to a reference of the rising edge of the signal of the subject reference base station.

Figure 7:
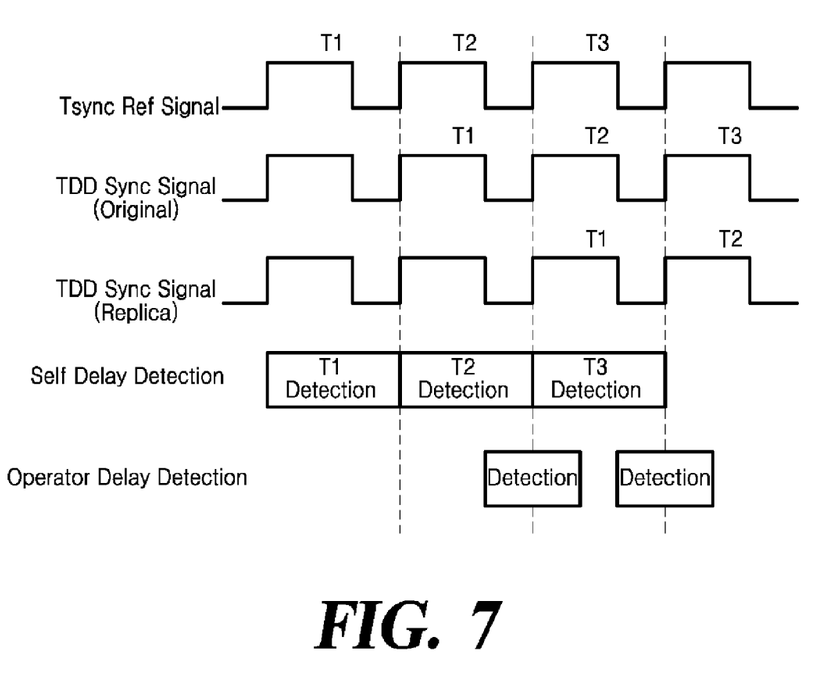
FIG. 7 is a timing chart of a TDD sync replica module and two delay detection modules.

FIG. 7 shows a timing chart of the TDD sync replica module 210 and the two TDD sync delay detection modules 220 and 230.

The replica module 210 examines one frame of the Tsync ref signal and outputs the one frame of the Tsync ref signal when there is no abnormality, whereby outputting the TDD sync signal (original) delayed by one frame than the Tsync ref signal.

The replica module 210 may store the TDD sync signal (original) having been established as a TDD sync signal (replica) and thereafter output the stored TDD sync signal (replica), whereby outputting the TDD sync signal (replica) delayed by at least two frames than the Tsync ref signal.

As a result, the TDD sync self delay detection module 220 operates on every frame of the Tsync ref signal, and the TDD sync operator delay detection module 230 operates as illustrated in FIG. 7 subject to the capture enable signals generated by the TDD sync signal.

Table 1 illustrates the operating performance or specifications for each exemplary module of a TDD sub-system. Table 1 indicates Capture Resolution, Capture Range, Accuracy, Alarm types to be generated, and Alarm Range that is alarming condition for delay of the TDD sync replica module 210 (denoted as 'Replica'), the TDD sync self delay detection module 220 (denoted as 'Self'), and the TDD sync operator delay detection module 230 (denoted as 'Operator').

TABLE 1

| Item | Replica | Self | Operator |
| --- | --- | --- | --- |
| Capure Resolution | 100 ns | 100 ns | 3.5G: 24.4 ns<br>2.5G: 32.6 ns(WCP),<br>16.3 ns(UQ),<br>48.8 ns(local) |
| Capure Range | 5 ms or 10 ms | 5 ms or 10 ms | ±4 us |
| Accuracy | ±1.5 us | ±1.5 us | ±1.5 us |
| Alarm | Tdd Sync Configuration Alarm | Self Delay Alarm | Operator Delay Alarm |
| Alarm Range | <−3 us, >+3 us | <−3 us, >+3us | <−3 us, >+3 us |

Figure 8:
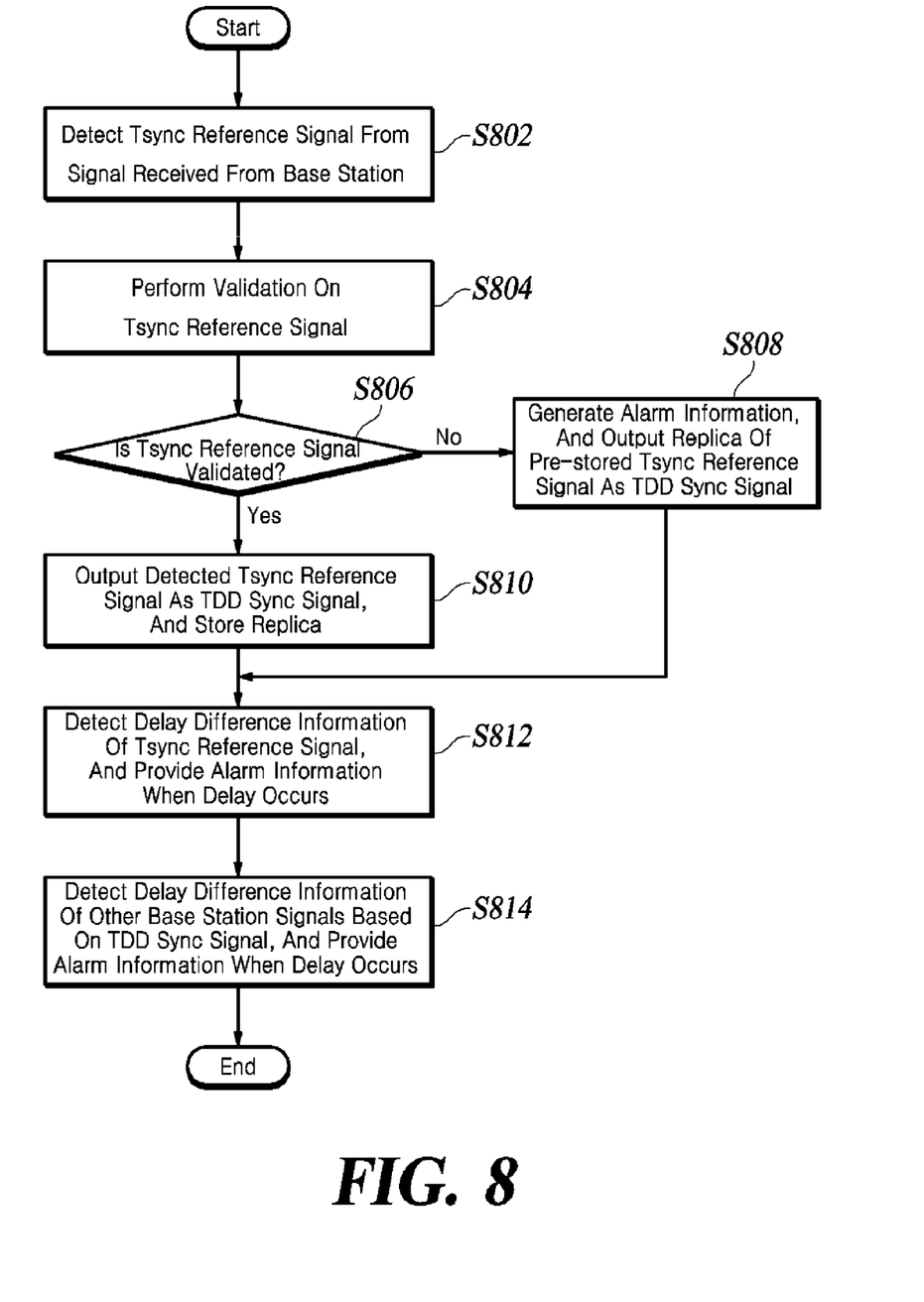
FIG. 8 is a flowchart of a TDD supporting operation performed by a distributed antenna system (DAS) implementing a TDD sub-system.

FIG. 8 is a flowchart of a TDD supporting operation performed by a distributed antenna system (DAS) implementing a TDD sub-system.

The TDD sub-system 112 detects a Tsync ref signal from a downlink signal of an RF frequency band or an IF frequency band received from one of a plurality of base stations (S802).

The TDD sub-system 112 performs validation on the Tsync ref signal detected by Step S802 (S804). In Step S804, the TDD AVC sub-system 112 may count low states and high states of the Tsync ref signal by the unit of a predetermined resolution, and may perform validation on the Tsync ref signal depending on whether the counting result complies with or conforms to the DL-UL configuration.

When the validation by Step S804 results in the Tsync ref signal being non-validated (S806), the TDD sub-system 112 generates a TDD sync configuration alarm and outputs a replica of a pre-stored Tsync ref signal as a TDD sync signal (S808). In Step S808, the replica of the pre-stored Tsync ref signal may be a replica of the Tsync ref signal whose validity is verified among the previous Tsync ref signals.

When the validation by Step S804 results in the Tsync ref signal being validated (S806), the TDD sub-system 112 outputs the Tsync ref signal as a TDD sync signal and stores the replica of the Tsync ref signal (S810).

The TDD sub-system 112 detects a delay difference of the Tsync ref signal detected by Step S802 and generates an alarm when the detected delay difference is out of a predetermined threshold range (S812).

The TDD sub-system 112 detects one or more delay differences of other network operators' signals from the TDD sync signal outputted by Step S808 or Step S810 and generates an alarm when the detected delay difference is out of a predetermined threshold range (S814).

Here, since Steps S802 through S814 correspond to the operations of the respective components of the TDD sub-system 112 described above, a detailed description thereof will be omitted.

Although the steps in FIG. 8 are described to be sequentially performed, they merely instantiate the technical idea of some embodiments of the present disclosure. In other words, a person having ordinary skill in the pertinent art could appreciate that various modifications, additions, and substitutions are possible by changing the sequences described in FIG. 8 or by performing two or more of the steps in parallel, without departing from the gist and the nature of the embodiments of the present disclosure, and hence the steps in FIG. 8 are not limited to the illustrated chronological sequence.

As described above, the time division duplexing mode supporting method illustrated in FIG. 8 may be implemented as a program and recorded in a computer readable recording medium (CD-ROM, RAM, ROM, memory card, hard disk, magneto-optical disk, storage device, etc.).

Although exemplary embodiments of the present disclosure have been described for illustrative purposes, those skilled in the art will appreciate that various modifications, additions and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

The invention claimed is:

1. A Time Division Duplexing (TDD) sub-system of a distributed antenna system, the TDD sub-system comprising:
    a TDD sync detection module configured to detect a Tsync reference signal from a signal received from a base station;
    a TDD sync replica module configured to perform a validation on the Tsync reference signal based on uplink/downlink configuration information associated with the signal, and to output the Tsync reference signal as a TDD sync signal for TDD switching control when the Tsync reference signal is verified to be valid and output a pre-stored Tsync reference signal as the TDD sync signal for the TDD switching control when the Tsync reference signal is not verified to be valid;
    a TDD sync self delay detection module configured to perform a detection of delay difference information of the Tsync reference signal and to provide, based on the detection, alarm information about whether or not the Tsync reference signal is delayed; and
    a TDD sync operator delay detection module configured to perform a detection of delay difference information of one or more other base station signals with respect to a reference of the TDD sync signal and to provide, based on the detection, alarm information about whether or not the other base station signal is delayed.

2. The TDD sub-system of claim 1, wherein the TDD sync replica module is configured to perform counting of low states and high states of the Tsync reference signal by a unit of a predetermined resolution, and to determine the Tsync reference signal to be non-validated when a counting result does not conform to the uplink/downlink configuration information.

3. The TDD sub-system of claim 2, wherein the TDD sync replica module is configured to provide alarm information telling whether or not the counting result conforms to the uplink/downlink configuration information based on whether the Tsync reference signal is validated or non-validated.

4. The TDD sub-system of claim 1, wherein the TDD sync replica module is configured to store a replica of the Tsync reference signal when the Tsync reference signal is validated.

5. The TDD sub-system of claim 1, wherein the pre-stored Tsync reference signal is a replica of a Tsync reference signal whose validity is verified among previous Tsync reference signals received in the TDD sync replica module.

6. The TDD sub-system of claim 1, wherein the TDD sync self delay detection module is configured to perform counting of an interval between rising edges in the Tsync reference signal by a unit of a predetermined resolution, to perform comparing of a counting result with a period of a TDD frame, to detect a delay difference based on a comparing result, and to provide the alarm information when a detected delay difference falls out with a predetermined threshold range.

7. The TDD sub-system of claim 1, wherein the TDD sync operator delay detection module is configured to perform detecting of delay difference information of the other base station signal by comparing a rising edge of the other base station signal with respect to a reference of a rising edge of the TDD sync signal, and to provide the alarm information when a detecting result falls out with a predetermined threshold range.

8. The TDD sub-system of claim 7, wherein the TDD sync operator delay detection module is configured to determine a predetermined section from the rising edge of the TDD sync signal as a detection range, to detect power from IQ data of the other base station signal, which is captured during the detection range, to detect a TDD sync signal corresponding to the other base station signal based on detected power, and to provide the alarm information when the TDD sync signal and other base station TDD sync signals have a delay deviation that falls out with the predetermined threshold range.

9. A method of supporting a Time Division Duplexing (TDD) mode of a distributed antenna system, the method comprising:
    detecting a Tsync reference signal from a signal received from a base station;
    performing a validation on the Tsync reference signal based on uplink/downlink configuration information associated with the signal, and outputting the Tsync reference signal as a TDD sync signal for TDD switching control when the Tsync reference signal is verified to be valid and outputting a pre-stored Tsync reference signal as the TDD sync signal for the TDD switching control when the Tsync reference signal is not verified to be valid;
    performing a detection of delay difference information of the Tsync reference signal and providing, based on the detection, alarm information about whether or not the Tsync reference signal is delayed; and
    performing a detection of delay difference information of one or more other base station signals with respect to a reference of the TDD sync signal and providing, based on the detection, alarm information about whether or not the other base station signal is delayed.

10. The method of claim 9, further comprising:
    providing alarm information on whether the uplink/downlink configuration information is complied with based on a result of the performing of the validation.

11. The method of claim 9, wherein the providing of the alarm information about whether or not the other base station signal is delayed comprises:
    performing detecting of delay difference information of the other base station signal by comparing a rising edge of the other base station signal with respect to a reference of a rising edge of the TDD sync signal, and providing the alarm information when a detecting result falls out with a predetermined threshold range.

12. A distributed antenna system, comprising:
    a TDD sync detection module configured to detect a Tsync reference signal from a signal received from a base station;
    a TDD sync replica module configured to perform a validation on the Tsync reference signal based on uplink/downlink configuration information associated with the signal, and to output the Tsync reference signal as a TDD sync signal for TDD switching control when the Tsync reference signal is verified to be valid and output a pre-stored Tsync reference signal as the TDD sync signal for the TDD switching control when the Tsync reference signal is not verified to be valid;

a TDD sync self delay detection module configured to perform a detection of delay difference information of the Tsync reference signal and to provide, based on the detection, alarm information about whether or not the Tsync reference signal is delayed; and a TDD sync operator delay detection module configured to perform a detection of delay difference information of one or more other base station signals with respect to a reference of the TDD sync signal and to provide, based on the detection, alarm information about whether or not the other base station signal is delayed.

* * * * *